March 7, 1950 D. J. REPKO 2,499,972
REAR DOOR LOCK FOR AUTOMOBILES
Filed Dec. 1, 1947 2 Sheets-Sheet 1

Inventor
Donald J. Repko
By Clarence A. O'Brien
and Harvey B. Jacobson
Attorneys March 7, 1950     D. J. REPKO     2,499,972
REAR DOOR LOCK FOR AUTOMOBILES
Filed Dec. 1, 1947     2 Sheets-Sheet 2
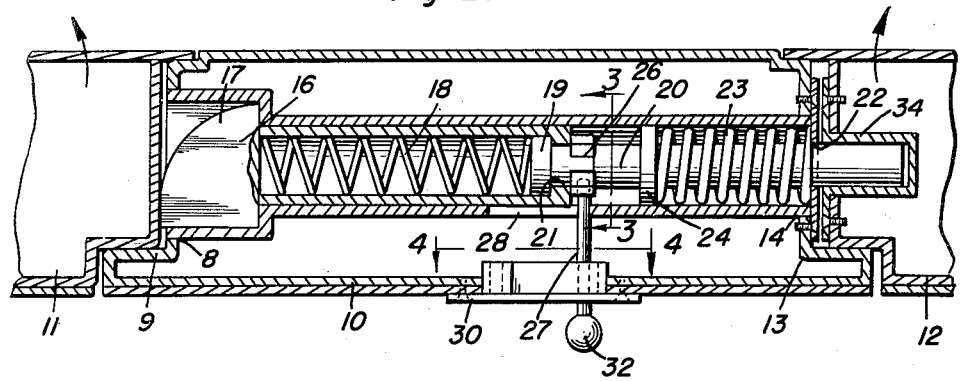
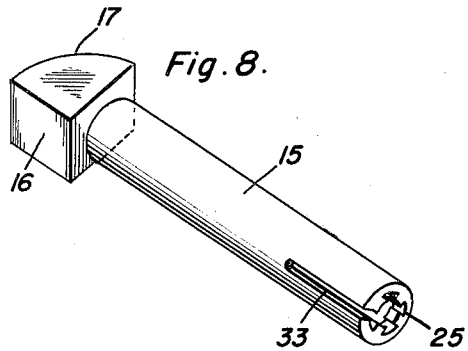
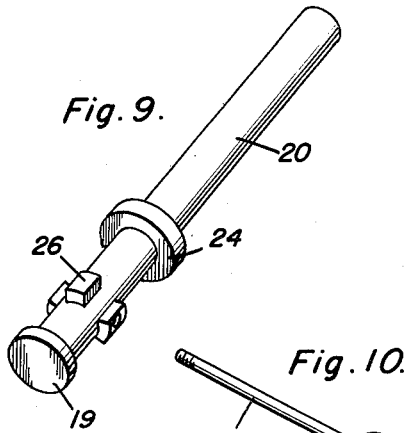
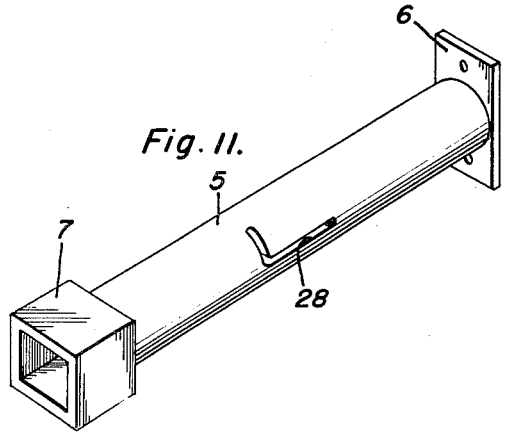
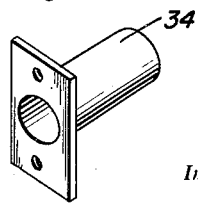
Inventor
Donald J. Repko
By *Clarence A. O'Brien and Harvey B. Jacobson*
Attorneys Patented Mar. 7, 1950

2,499,972

UNITED STATES PATENT OFFICE 2,499,972

REAR DOOR LOCK FOR AUTOMOBILES

Donald J. Repko, Gilbertsville, Pa.

Application December 1, 1947, Serial No. 789,015

6 Claims. (Cl. 292—182)

The present invention relates to new and useful improvements in locks for the rear doors of four door automobiles and more particularly to means whereby the rear door will be automatically locked by the closing of the front door and cannot be opened until the front door is opened.

A further object of the invention is to provide a lock mechanism of this character which may be rendered inoperative, when desired, so that the rear door may be opened independently of the front door.

A still further object is to design and construct a rear door lock for automobiles whereby children will be safely locked in the rear of the car without danger of accidentally opening the rear door while the automobile is moving and in which the operating lever is easily accessible to occupants of the front seat.

Another object of the invention is to provide a door lock of this character which may be easily installed in position adjacent the free edges of the front and rear doors of an automobile without necessitating any material changes in the construction thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is an enlarged longitudinal sectional view taken on a line 2—2 of Figure 1;

Figure 8 is a perspective view of the front door actuated plunger;

Figure 9 is a similar view of the rear door locking bolt;

Figure 10 is a similar view of the control lever;

Figure 11 is a perspective view of the housing for the plunger and bolt, and

Figure 12 is a perspective view of the keeper for the bolt.

Figure 1:
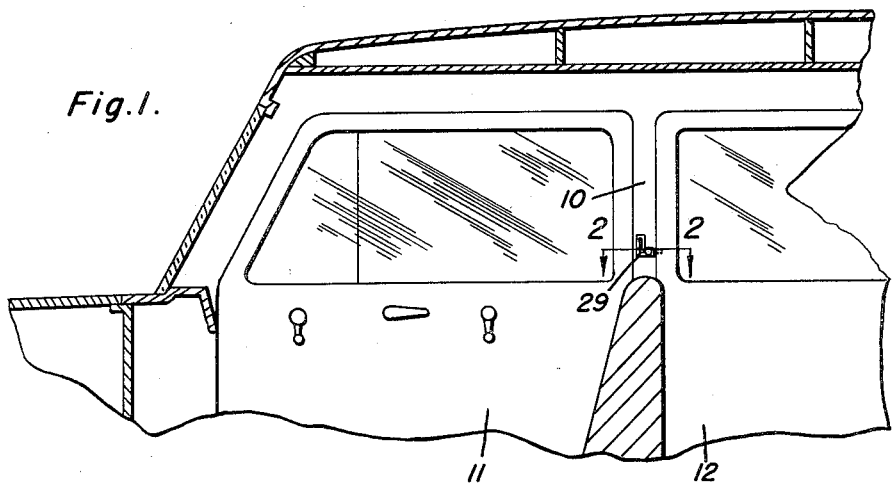
Figure 1 is a fragmentary longitudinal sectional view of an automobile body showing the position of the safety lock therein.
Figure 3:
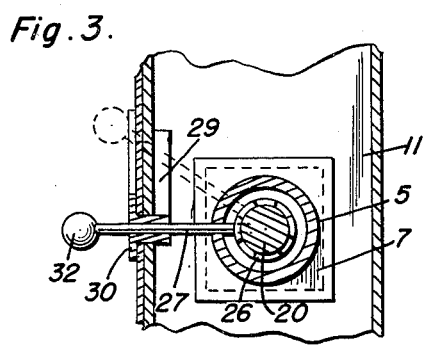
Figure 3 is a transverse sectional view taken on a line 3—3 of Figure 2.
Figure 4:
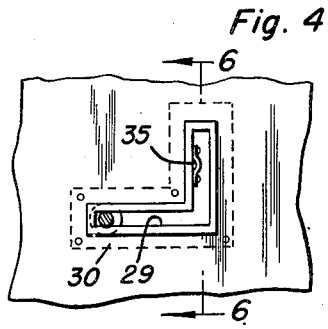
Figure 4 is a fragmentary longitudinal sectional view taken on a line 4—4 of Figure 2 and showing the guide for the lock controlling lever.
Figure 5:
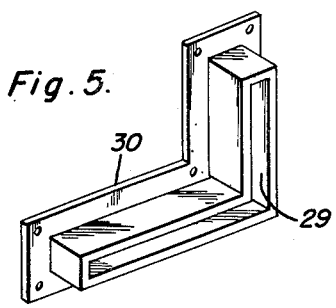
Figure 5 is an enlarged perspective view of the guide.
Figure 7:
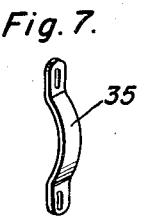
Figure 7 is a perspective view of the spring catch for the lever.
Figure 6:
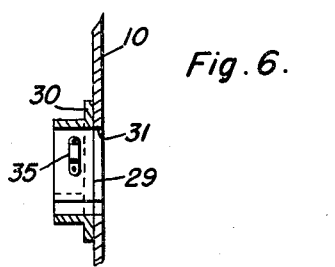
Figure 6 is a vertical sectional view taken on a line 6—6 of Figure 4.

Referring now to the drawings in detail wherein for the purpose of illustration, I have disclosed a preferred embodiment of the invention the numeral 5 designates a tubular housing having an attaching plate 6 at its rear end and a polygonal shaped boxing 7 at its front end, the outer end of the boxing being open.

The boxing 7 is suitably secured in an opening 8 in the front door jamb 9 of a center post 10 positioned between the front door 11 and rear door 12 of an automobile. The rear door jamb 13 is also provided with an opening 14 receiving the rear end of the housing 5 and the plate 6 is suitably attached to the jamb 13.

A hollow plunger 15 is slidably mounted in the front portion of the housing 5 and is formed with a head 16 conformably received in the boxing 7 and having a rounded outer edge 17 for engagement by the front door 11 upon the closing movement of the latter to slide the plunger 15 rearwardly.

The plunger 15 is projected forwardly by a coil spring 18 positioned therein with its front end bearing against the head 16 and its rear end bearing against a flange 19 at the front end of a bolt 20 slidable in the plunger. The rear end of the plunger is inwardly flanged as shown at 21 for engagement behind the flange 19 to hold the plunger and bolt in assembled relation.

The rear end of the bolt 20 is slidable through an opening 22 in the attaching plate 6, the plate 6 forming an abutment for a coil spring 23 surrounding the bolt and having its front end bearing against a flange 24 on the bolt to retract the bolt in the housing 5, spring 23 being of sufficient strength to overcome the spring 18.

The flange 21 of the plunger 15 is internally notched as shown at 25 for the passage of circumferentially spaced apart lugs 26 carried by the bolt 20. A manual operating lever 27 has one end threaded into one of the lugs 26 and projects laterally outwardly through an L-shaped slot 28 in housing 5 and through an aligned L-shaped slot 29 in a corresponding shaped plate 30 secured in alignment with an opening 31 in the door post 10. The outer end of the lever 27 is provided with a finger gripping knob 32.

The rear end of the plunger 15 is formed with a longitudinally extending slot 33 aligned with one of the notches 25.

A recessed keeper 34 is attached to the free edge of the rear door 12 to receive the rear end of the bolt 20 when in its projected position.

In the operation of the device, the housing 5 is mounted in a longitudinal position in the door post 10 as shown in Figure 2 of the drawings and with the plunger 15 and bolt 20 slidably carried thereby. The front door must be opened to change the lock from locked to unlocked position or vice versa.

The spring 23 normally retracts the bolt 20 so that the rear door 12 is free to open independently of the front door 11. During this action, the lever 27 is positioned in the upper vertical portion of the L-shaped slots 28 and 29 with the notches 25 and lugs 26 aligned and the closing movement of the door 11 slides the head 16 and plunger 15 rearwardly without affecting the bolt 20 and during which the lever 27 works in the slot 33 of the plunger.

When it is desired to lock the rear door 12 by the bolt 20, the front door is opened and the lever 27 is lowered to the horizontal portion of the slotted guide 29 which rotates the bolt 20 to move the lugs 26 out of alignment with the notches 25 in the rear end of plunger 15 whereby a rearward movement of the plunger will engage the lugs and transmit the movement of the plunger to the bolt. Accordingly, as the front door 11 is closed, the plunger 15 and bolt 20 move rearwardly as a unit, the rear end of the bolt 20 being projected into the keeper 34 to thus lock the rear door 12.

The lever 27 is held in its raised locked position by a leaf spring 35 secured in the vertical portion of the slot 29 which functions as a catch to hold the lever in its raised position.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. In a locking device for oppositely swingable doors having an intervening post between the doors, a spring retracted sliding bolt in the post for locking one of the doors, a sliding plunger in the post having interlocking engagement with the bolt and actuated by a closing movement of the other door to project the bolt into its door locking position, and means operable to release the bolt from engagement with the plunger by a rotary movement of the bolt relative to the plunger for independent sliding movement thereof.

2. In a locking device for oppositely swingable doors having an intervening post between the doors, a spring retracted sliding bolt in the post for locking one of the doors, a sliding plunger in the post, said bolt and plunger having an interlocking engagement with each other, movable into and out of interlocking engagement by a rotary movement of one relative to the other, said plunger being actuated by a closing movement of the other door to project the bolt into its door locking position when the bolt and the plunger are in interlocking engagement, and means for releasing the bolt and plunger from interlocking engagement with each other for independent sliding movement thereof.

3. In a locking device for oppositely swingable doors having an intervening post between the doors, a spring retracted sliding bolt in the post for locking one of the doors, a sliding plunger in the post, said bolt and plunger having an interlocking engagement with each other movable into and out of interlocking engagement by a rotary movement of one relative to the other, said plunger being actuated by a closing movement of the other door to project the bolt into its door locking position when the bolt and the plunger are in interlocking engagement, and means for releasing the bolt and plunger from interlocking engagement with each other for independent sliding movement thereof, said means comprising a lever projecting laterally from the bolt.

4. In a locking device for oppositely swingable doors having an intervening post between the doors, a spring retracted sliding bolt in the post for locking one of the doors, a sliding plunger in the post, said bolt and plunger having an interlocking engagement with each other movable into and out of interlocking engagement by a rotary movement of one relative to the other, said plunger being actuated by a closing movement of the other door to project the bolt into its door locking position when the bolt and the plunger are in interlocking engagement, and means for releasing the bolt and plunger from interlocking engagement with each other for independent sliding movement thereof, said means comprising a lever projecting laterally from the bolt, and means for locking the lever in position to hold the bolt and plunger in interlocking engagement.

5. In a locking device for oppositely swingable doors having an intervening post between the doors, a spring projected plunger slidable in the post in the path of closing movement of one of the doors for actuation thereby, a spring retracted bolt slidable in the post for locking engagement with the other door, said plunger and said bolt having a slidable and rotatable engagement one within the other and said plunger being held against rotary movement, interlocking lugs carried by the plunger and bolt interlockably engaged with each other by a rotary movement of the bolt for sliding the plunger and bolt as a unit, and a radially projecting lever carried by the bolt for rotating the bolt into a released position.

6. In a locking device for oppositely swingable doors having an intervening post between the doors, a spring projected plunger slidable in the post in the path of closing movement of one of the doors for actuation thereby, a spring retracted bolt slidable in the post for locking engagement with the other door, said plunger and said bolt having a slidable and rotatable engagement one within the other and said plunger being held against rotary movement, interlocking lugs carried by the plunger and bolt interlockably engaged with each other by a rotary movement of the bolt for sliding the plunger and bolt as a unit, and a radially projecting lever carried by the bolt for releasing the bolt from the plunger, and an L-shaped guide carried by the post for the lever.

DONALD J. REPKO.

REFERENCES CITED

The following references are of record in the file of this patent:

UNITED STATES PATENTS

| Number | Name | Date |
|---|---|---|
| 1,790,104 | Levitt et al. | Jan. 27, 1931 |
| 2,161,930 | Niswonger et al. | June 13, 1939 |
| 2,273,149 | Shannon et al. | Feb. 17, 1942 |